Patented Jan. 24, 1939

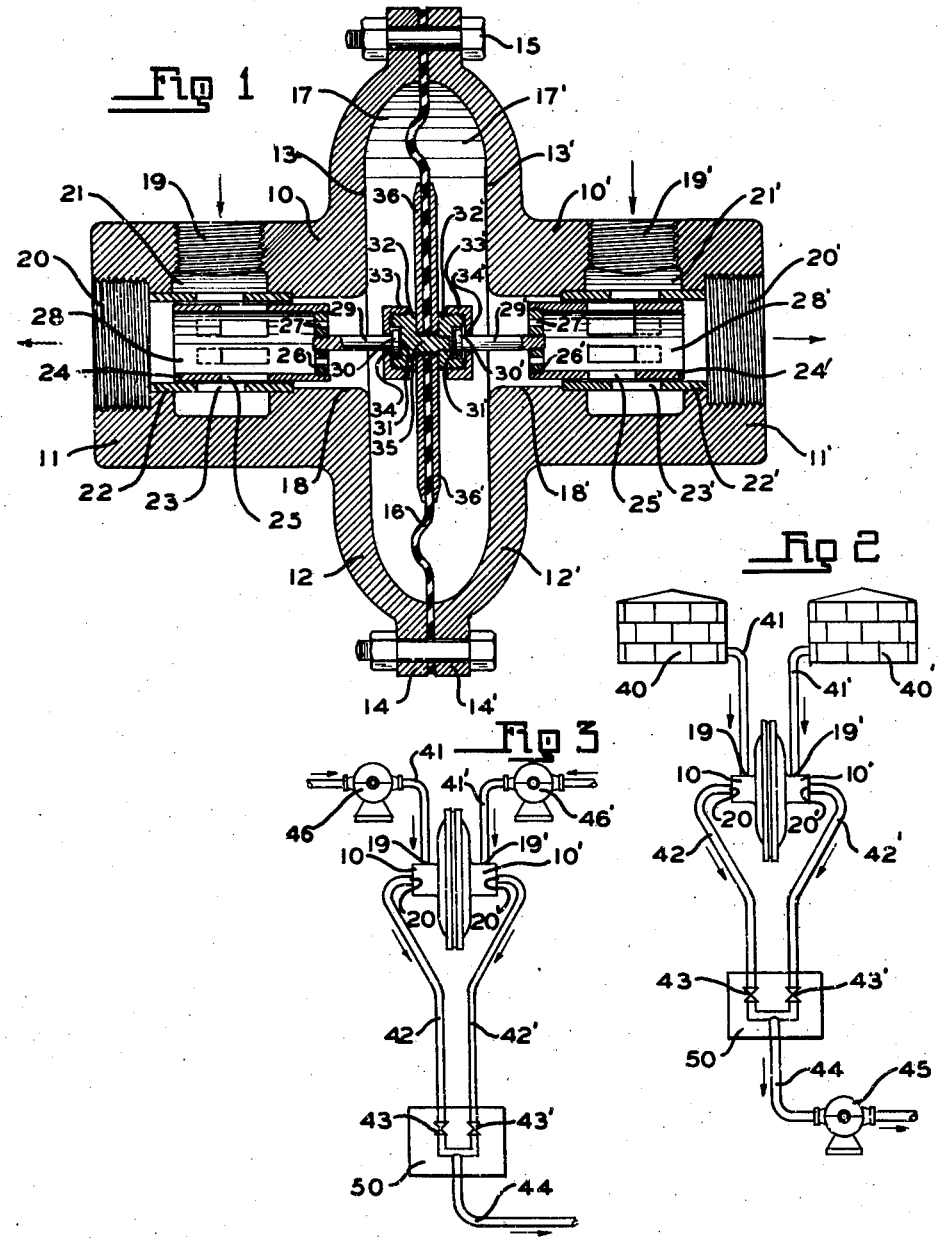

2,145,114

UNITED STATES PATENT OFFICE 2,145,114

PRESSURE REGULATOR FOR BLENDING APPARATUS

Lloyd T. Gibbs and Gerald P. Jennings, Bartlesville, Okla., assignors to Phillips Petroleum Company, Bartlesville, Okla., a corporation of Delaware Application September 10, 1935, Serial No. 39,991

3 Claims. (Cl. 137—165)

This invention relates to improved apparatus for blending and dispensing fluids, and in particular to new and improved apparatus for controlling and equalizing the pressure of fluids in the course of blending and mixing them.

The object of this invention is to provide an efficient and accurate device whereby a plurality of fluids may be blended and mixed in any predetermined desired proportion.

Another object of this invention is to provide a device for blending and mixing a plurality of fluids whereby the proportions of the plurality of liquids constituting the blend can be more positively and accurately controlled.

Still another object of this invention is to provide apparatus whereby the pressure and volume of a plurality of fluids in movement may be controlled and regulated.

A further object of this invention is to provide apparatus for automatically controlling and equalizing the pressure on a plurality of streams of fluid in movement.

A still further object of this invention is to provide apparatus for handling a plurality of streams of fluid in motion whereby the pressures on the same are automatically regulated, controlled and equalized by each other.

While the present invention has a wide range of adaptability and may be used in connection with the blending and mixing of practically any type or kind of liquid or gas, the embodiment of the invention to be herein described has been designed with an especial view to handling liquid hydrocarbons, such as gasoline, fuel oil, and the like.

Still further objects and advantages of this invention will be appreciated and become more apparent upon a consideration of the following specification and the attached drawing, forming a part thereof, and wherein like reference characters designate like parts throughout the several views, and wherein, Fig. 1 illustrates one embodiment of the invention and discloses the automatic device for controlling and regulating the pressure and volume of a plurality of streams of fluid in movement, Fig. 2 diagrammatically illustrates an embodiment of the present invention for blending and dispensing fluids and regulating the pressures of a plurality of streams of fluid, illustrated in Fig. 1, and Fig. 3 illustrates a further embodiment of the fluid blending and dispensing method and pressure regulator.

The present invention concerns itself with the blending and admixing of a plurality of different types of fluids or liquids in any desired proportion. And to this extent it is related to the copending patent applications of Arthur H. Riney and Lloyd T. Gibbs, Serial Numbers 39,989 and 39,990, both entitled, "Apparatus for blending liquids", filed on even date herewith.

In the above referred to patent applications, fluid blending apparatuses are disclosed and claimed. The fluid blending units or devices essentially comprise a plurality of fluid inlet orifices, the open areas of which can be controlled to regulate the admixture in any desired proportions of a plurality of different types of fluids. For instance, assume that two different liquids are being admixed or blended, and that these liquids are flowing through independent conduits and enter a mixing chamber. Now if it is desired to make a blend composed of equal portions of each liquid, the orifices of each conduit, assuming that they are equal, will be so regulated as to be exactly one half open. This arrangement when under favorable conditions, will give the desired blend composed in equal proportions of the two different liquids. But this will only be true when the pressure on the two sources of liquid are the same and equal to each other, for otherwise regardless of how the blending device is controlled and its orifices regulated, the liquids flowing therethrough will not produce the desired accurate blend unless the pressure of the liquids is controlled so that they are constantly equal and in this manner, when the pressures are equal, the volumes of the liquids flowing through the inlet orifices of the blending unit are in true proportion to the regulated open area or size of the orifices so that a true and accurate blend of the liquids is obtained in accordance with the setting of the inlet orifices.

In Fig. 1 there is illustrated one form of the invention which shall be termed an equal pressure regulator, or a pressure equalizer and which consists of a pair of complementary cylindrical members 10 and 10', including the reduced portions 11 and 11', and the flared portions 12 and 12', which form therebetween a chamber defined by the walls 13 and 13'. Formed integral with the flared portion 12 and 12' are the flanges 14 and 14' which are held together by the bolts 15. Interposed between the flanges 14 and 14' and retained thereby is a flexible diaphragm 16, which may be composed of any suitable material such as rubber, flexible fabric or thin metal, and which divides the interior chamber 13 of the pressure equalizer into separate chambers 17 and 17'. Each of the reduced portions 11 and 11' have central bores 18 and 18', which are in alignment with each other, and are provided with the inlets 19 and 19' and the outlets 20 and 20'. Portions of the inlets and outlets are screw threaded for connection with pipes as will be later described. Adjacent the inlets 19 and 19', the bores 18 and 18' are provided with enlarged annular spaces 21 and 21'. Cylinders 22 and 22' are stationarily positioned in the bores 18 and 18' respectively. These cylinders are each provided with a plurality of circumferentially arranged and aligned slotted orifices 23 and 23' which are in alignment with the annular chambers 21 and 21', and adjacent the inlets 19 and 19'. Closely fitted in the stationary cylinders 22 and 22', so as to be slidable therein, are the sleeves 24 and 24' which are provided with the plurality of circumferentially arranged and aligned ports or orifices 25 and 25'. The inner ends of the sleeves 24 and 24' are provided with the plugs 26 and 26' which have openings 27 and 27' formed therein so that on one side of diaphragm 16 the inlet 19, the annular space 21 and the outlet 20 connecting with the space 28 interior of sleeve 24 are in communication with the portion 17 of chamber 13. While on the other side of the diaphragm 16 the chamber 17' is in communication, by virtue of the openings 27' in the plug 26', with the interior 28' of sleeve 24', the outlet 20' connecting therewith, and the annular space 21' and the inlet 19'.

Fastened to the plugs 26 and 26' are the stems 29 and 29' having the enlarged heads 30 and 30' which fit into sockets 31 and 31' formed in the plugs 32 and 32'. Having a screw threaded connection with the plugs 32 and 32' are the flanged discs 33 and 33' which are provided with the apertures 34 and 34' through which pass the stems 29 and 29'. The flanged discs 33 and 33' serve to retain the heads 30 and 30' in the sockets 31 and 31'. The plug 32 is provided with a screw threaded shank 35 which passes through the diaphragm 16, and the reinforcement plates 36 and 36' of the diaphragm 16, and makes a screw threaded connection with the plug 32'.

With this arrangement and construction, the sleeves 24 and 24' are connected by virtue of the stems 29 and 29', and the movement of one sleeve in either direction induces and causes a movement of the same magnitude in the other sleeve in the same direction. It will be further appreciated that the sleeves 24 and 24' are, through the stems 29 and 29' and their connection with each other, also fastened to the diaphragm 16, so that any movement thereof affects the two sleeves 24 and 24' in like amounts in the same directions.

In Fig. 1 the diaphragm 16 is in its neutral or central position, and the sleeves 24 and 24' are in such a relation with respect to the cylinders 22 and 22' that the orifices 23 and 23' do not coincide with the orifices 25 and 25' but instead overlap to such an extent that the effective open area of the orifices is equal to about one half the size of the orifices. If the diaphragm 16 were shifted to its extreme right hand side, the sleeves 24 and 24' would be moved in the same direction with the result that the orifices 23' and 24' would be in alignment, thus forming an effective open orifice area on the right side of the pressure equalizer equal in size to the area of the orifices 23' and 24'. Under the above conditions the sleeve 24 would move to the right to such an extent that orifices 23 and 25 would be completely closed by the sleeve 24 and cylindrical member 22. A movement of the diaphragm to the extreme left would have a directly opposite effect to that immediately described. Thus it will be seen that any position of the diaphragm except in neutral, or dead center, will vary the size of the inlet openings formed by the orifices 23 and 25, and 23' and 25'. It is to be noted, however, that regardless of the position of the diaphragm 16, the total effective and open area of the inlet orifices on both sides of the diaphragm is a fixed constant and is always equal in area to the size of any one of the single orifices.

In operation the pressure equalizer as shown in Fig. 1 will function substantially as follows: Fluid or liquid of one type and under a certain pressure will enter the device through inlet 19, while another fluid, or liquid of another type and of a certain pressure will enter through inlet 19'. Now if the pressures of these two liquids are identical, they will exert an equal force on opposite sides of the diaphragm 16, and so in this manner the open area of the inlet produced by the orifices 23 and 25 will be equal to one half the area of these orifices, and the open area of the inlet produced by the orifices 23' and 25' will be of equal size, so that equal amounts of the two different fluids or liquids, both having the same pressure, will be continuously leaving by the outlets 20 and 20'. Assume now that the liquid, for instance, which enters at 19 is of a pressure higher than that of the liquid entering at 19'. Under these conditions the liquid on the left will exert a force on the diaphragm 16 greater than the force exerted from the other side. The result will be that the diaphragm 16 is forced over to the right, thus moving the sleeves 24 and 24' in that direction, and the area of the inlet opening on the left will become decreased, while the area of the inlet opening on the right increases.

With the inlet opening on the left, formed by the orifices 23 and 25 now reduced, the liquid of a high pressure enters therethrough in a restricted flow and by the time it has entered the chamber 28, interior of the sleeve 24, its flow has been materially lessened, resulting in the lowering of its pressure therein so that as it leaves by outlet 20 it is of the same pressure as the liquid which has entered inlet 19' and passed through the outlet 20'. The size of the openings to the chambers 28 and 28' formed by the orifices 23 and 25, and 23' and 25', respectively, are automatically regulated in accordance with the pressures of the two streams of liquid entering 19 and 19' so that the chambers 28 and 28' act as throttling areas to equalize the pressures of the liquids therein before it passes to the outlets.

The difference in pressure between the two liquids entering inlets 19 and 19' act to regulate the size of the openings 23 and 25 related to inlet 19 on the left, and openings 23' and 25' related to inlet 19' on the right, so that the flow of liquid under a high pressure must pass through a small inlet orifice and into a chamber such as 28 or 28', thereby decreasing its pressure, while the flow of liquid of a low pressure is allowed to pass through a relatively large inlet orifice and its pressure is not impaired. The result is that with the above described pressure equalizer two different streams of liquid, each having a different pressure, enter the equalizer and due to their differences in pressure, automatically regulate and set the orifices through which they flow into the chambers 28 and 28' in such a manner that as the two streams of liquid leave the equalizer their pressures are the same.

In Fig. 2 there is illustrated a method and apparatus for blending and dispensing liquids which includes the pressure equalizer 10, substantially as above illustrated, and which consist of a pair of tanks 40 and 40' each containing a different type fluid or liquid under a different pressure. The liquid from these tanks flows respectively through the pipes 41 and 41' to the inlets 19 and 19' of the pressure equalizer 10. Regardless of the variance in pressure of the two separate sources of fluid or liquid entering at 19 and 19', the pressure equalizer will automatically function so that the two streams of fluid will leave at the outlets 20 and 20' under equal pressures and enter the pipes 42 and 42' which lead to a liquid blending device 50 such as that described and claimed in the above mentioned, copending patent applications of Arthur H. Riney and Lloyd T. Gibbs.

As the pressure on the two streams of different fluid entering the blending device 50 through the pipes 42 and 42' are equal, a true and accurate blend of these liquids may be made in direct accordance with the setting or controlling of the mixing or blending orifices 43 and 43' of the blending unit. A pipe 44 leads from this unit and has interposed therein a suction pump 45 which draws the liquids through the blending unit. It is to be understood, that the liquid could be flowed through the pressure equalizer and meter by gravity. By this arrangement, with the blending unit on the suction side of the pump, positive assurance is had that the blend will be accurate, for the liquids enter the blending unit at uniform pressure, effected by the equal pressure regulator, and are drawn through the blending unit, and its controlled mixing orifices, by the pump, or forced therethrough by gravity, so that an exact blend of the two different liquids is had in strict accordance with the setting of its controlled orifices.

A similar arrangement to that just described is illustrated in Fig. 3, but in this instance the pump 45 shown in Fig. 2 is dispensed with, and instead a pair of pumps 46 and 46' are provided which force two different types of fluids or liquids, which also may be under different pressures, through the pipes 41 and 41' to pressure equalizer 10. But also in this instance the pressure equalizer 10 treats the two streams of liquid, and discharges them into the pipes 42 and 42' leading to the blending unit 50, in such a manner that the pressure thereof is equalized when they enter the blending unit. In this manner an accurate blend of two different types of liquid can also be made and controlled regardless of their original pressures.

We claim:

1. In a device for equalizing the pressure of a plurality of streams of fluid, a casing, a diaphragm positioned in said casing and dividing the same into a plurality of chambers, an inlet and an outlet for each chamber terminating in orifices therein, a sleeve slidably mounted in each said chamber and connected to said diaphragm for movement therewith, said sleeve having open ends, one said open end being adjacent one said orifice in said chamber, the other said open end being adjacent said diaphragm, and ports in said sleeve adapted to register with the other said orifice in said chamber.

2. In a device for equalizing the pressure of a plurality of streams of fluid, a casing, a diaphragm positioned in said casing and dividing the same into a plurality of chambers, an inlet and an outlet for each chamber with orifice openings between the two, a sleeve slidably mounted in each of said chambers and connected to said diaphragm for movement therewith and orifice openings in the sleeve which mate with the orifice openings between the inlet and outlet of the chamber, the combined open areas in both inlets for any position of the diaphragm being equal to the full opening of any one inlet.

3. In a device for equalizing the pressure of a plurality of streams of fluid, comprising a casing, a diaphragm positioned in the casing and dividing the same into a plurality of chambers each of which is provided with an inlet and an outlet, slotted orifice openings between the inlets and outlets of the chambers, a sleeve slidably mounted in each chamber and connected to said diaphragm for movement therewith, said sleeves having one end opening to the outlet ports and the other end having openings leading to the diaphragm, and the main circumferential body of the sleeve having slotted openings which cooperate with the slotted openings between the inlets and outlets of the chambers to restrict the flow of fluid from the inlets and thereby equalize the pressure of the two streams.

LLOYD T. GIBBS.
GERALD P. JENNINGS.